(12) United States Patent
Ishikawa et al.

(10) Patent No.: US 7,073,648 B2
(45) Date of Patent: Jul. 11, 2006

(54) POWER TRANSMISSION MECHANISM (75) Inventors: Tomoaki Ishikawa, Wako (JP);
Kazuyoshi Miyahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 10/949,954

(22) Filed: Sep. 24, 2004

(65) Prior Publication Data
US 2005/0087418 A1 Apr. 28, 2005

(30) Foreign Application Priority Data
Oct. 24, 2003 (JP) .............................. 2003-365222

(51) Int. Cl.
*F16D 41/12* (2006.01)

(52) U.S. Cl. ..................... 192/43.1; 192/39; 192/46; 192/50

(58) Field of Classification Search ................. 192/39, 192/43.1, 46, 50
See application file for complete search history.

(56) References Cited

U.S. PATENT DOCUMENTS

| 4,909,365 | A |   | 3/1990 | Tillotson et al. ............... 192/35 |
| 4,928,905 | A | * | 5/1990 | Granzotto et al. ........... 242/343 |
| 6,354,414 | B1 | * | 3/2002 | Sueshige et al. ............... 192/45 |
| 6,575,280 | B1 | * | 6/2003 | Ballew et al. ................ 192/46 |

FOREIGN PATENT DOCUMENTS

JP 01-059531 A 3/2001

* cited by examiner

*Primary Examiner*—Richard M. Lorence
(74) *Attorney, Agent, or Firm*—Adams & Wilks (57) ABSTRACT A power transmission mechanism for transmitting a driving force from a drive shaft to a driven member of a gear via a one-way clutch is provided. The one-way clutch includes a swinging clutch portion swingably fitted in a clutch portion housing groove formed in a first end portion of the drive shaft. The swinging clutch portion has a cylindrical portion as the axis of rotation and a projecting portion. When the drive shaft rotates, the projecting portion of the swinging clutch portion is raised by a slit of a collar fitted onto the drive shaft, engaging one of a plurality of engaging grooves formed in the inner peripheral surface of the driven member. When the drive shaft does not rotate, the swinging clutch portion lies down, and the projecting portion does not engage any engaging groove, allowing the driven member to rotate bidirectionally relative to the drive shaft.

2 Claims, 10 Drawing Sheets

POWER TRANSMISSION MECHANISM

FIELD OF THE INVENTION

The present invention relates to power transmission mechanisms employing a one-way clutch in a drivetrain.

BACKGROUND OF THE INVENTION

One-way clutches, which transmit power in a fixed direction, are, for example, provided at right and left ends of a drive shaft of a self-propelled walk-behind lawn mower in order to facilitate turning of the lawn mower and allow the lawn mower, when moved with an engine stopped, to be easily pushed and moved by hand (see, e.g., U.S. Pat. No. 4,909,365 and Japanese Patent Laid-Open Publication No. 2001-59531).

First, a freewheel clutch disclosed in U.S. Pat. No. 4,909,365 will be described with reference to FIG. 9.

Figure 9:
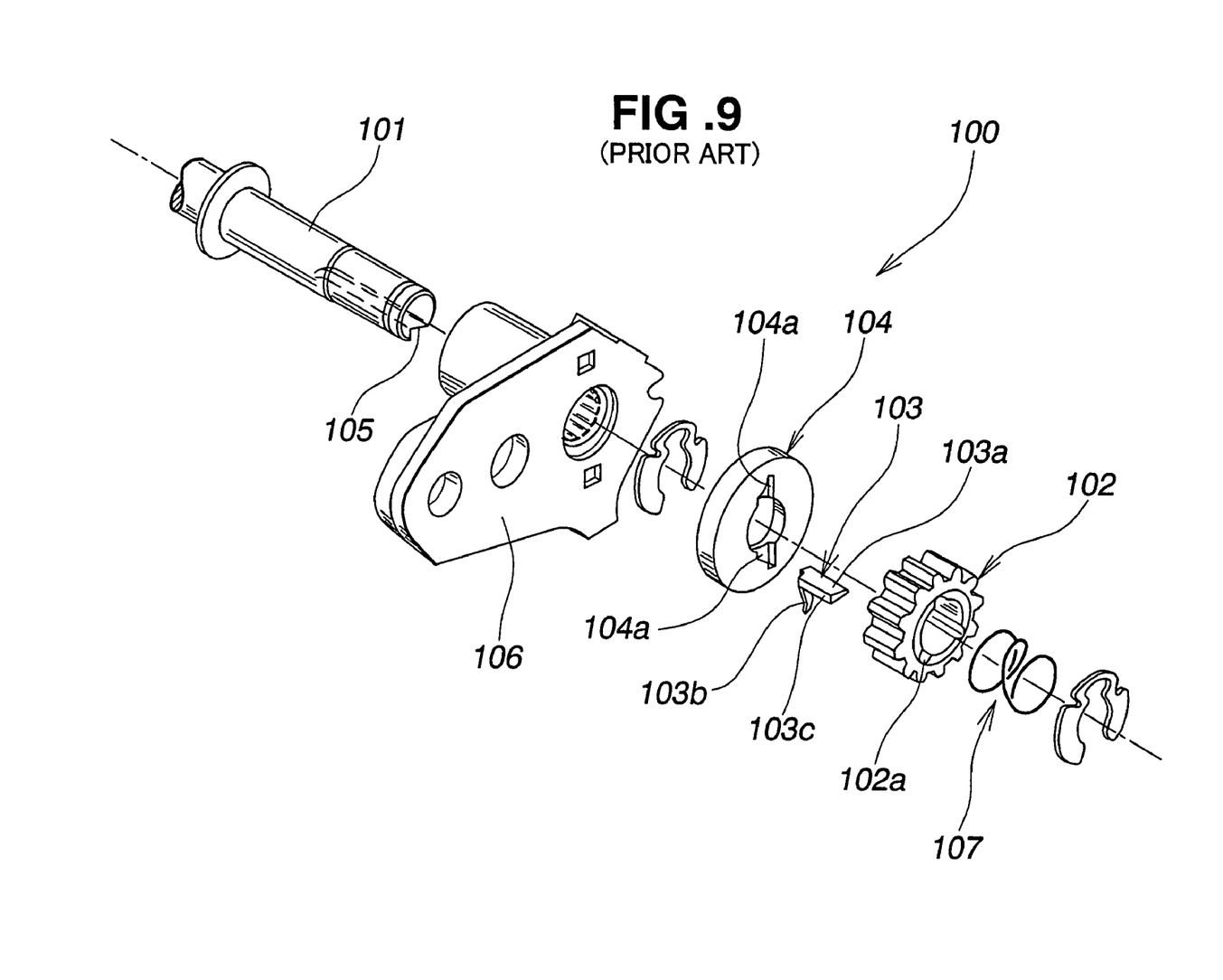
FIG. 9 is a perspective view of the basic structure of a conventional freewheel clutch.

Referring to FIG. 9, a clutch mechanism 100 is used for transmitting a driving force of a drive shaft 101 to a pinion 102. The clutch mechanism 100 includes, as its main elements, a key 103 and a friction disc 104. The key 103 has a wedge portion 103a to be received in a first keyway 105 axially formed in the drive shaft 101, in such a manner as to be able to rock therein to extend therefrom and retract thereinto, and a projecting portion 103b to be received in a hollowed portion 104a formed in the friction disc 104. The wedge portion 103a has a thick side portion forming an engaging portion 103c.

When the drive shaft 101 is rotated, the key 103 is simultaneously rotated, causing the projecting portion 103b of the key 103 to abut on the hollowed portion 104a of the friction disc 104. Since the friction disc 104 is in frictional engagement with a housing 106, the projecting portion 103b of the key 103 is not moved further. Thus, the wedge portion 103a of the key 103 is cocked, projecting from within the first keyway 105. The engaging portion 103c of the wedge portion 103a engages one of a plurality of second keyways 102a formed in the inner peripheral surface of the pinion 102, thereby ensuring transmission of a driving force of the drive shaft 101 to the pinion 102.

When the drive shaft 101 is not rotated, the wedge portion 103a of the key 103 is received within the first keyway 105 without being cocked, and the pinion 102 can rotate bidirectionally relative to the drive shaft 101.

The above clutch mechanism 100, however, has a problem that, for producing rotation resistance at the friction disc 104 by a thrust spring 107, it is necessary to reduce variations in friction coefficient between the surface of the housing 106, the opposite surfaces of the friction disc 104 and the surface of the pinion 102, resulting in time-consuming surface treatment of these components.

Second, a power transmission mechanism disclosed in Japanese Patent Laid-Open Publication No. 2001-59531 will be described with reference to FIGS. 10A to 10C.

Figure 10A:
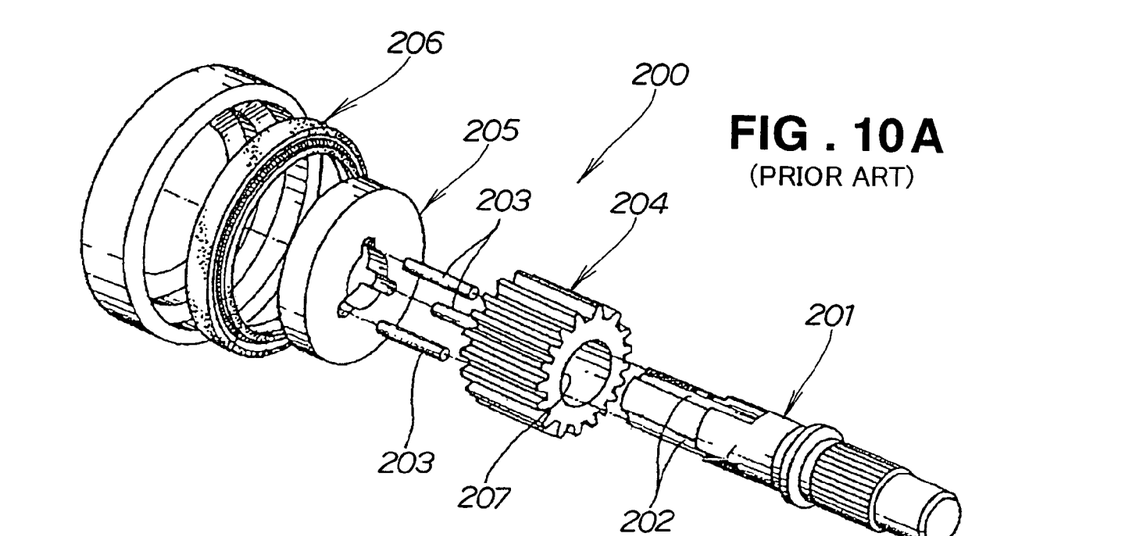
FIGS. 10A to 10C are diagrams illustrating the basic structure and function of a conventional power-transmission mechanism.
Figure 10B:
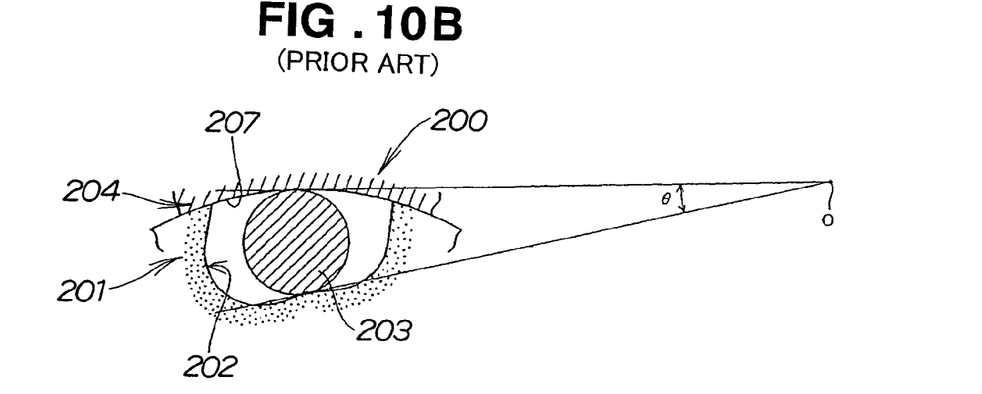
Figure 10C:
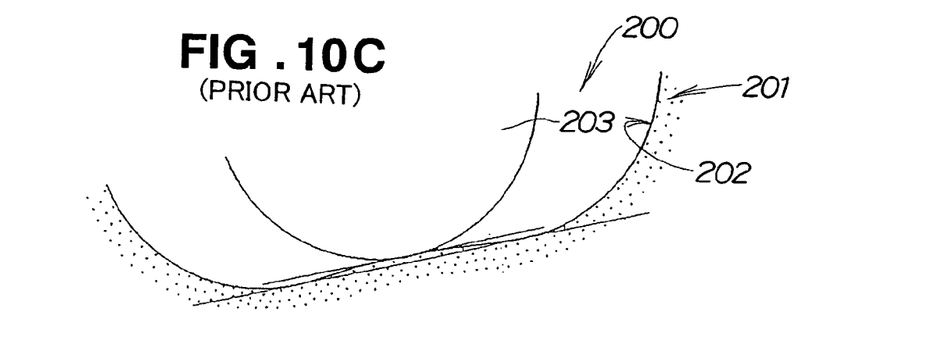

A power transmission mechanism 200 shown in FIG. 10A includes a drive shaft 201, a plurality of pins 203 (three in the illustrated example) fitted in a plurality of cam grooves 202 formed in the drive shaft 201, a gear 204 and a friction disc 205 fitted onto the drive shaft 201, and an oil seal 206 fitted onto the friction disc 205. When the drive shaft 201 is not rotated, the pins 203 are detached from the inner peripheral surface of the gear 204 forming a hole 207, allowing the gear 204 to rotate bidirectionally relative to the drive shaft 201.

The above power transmission mechanism 200, however, requires highly accurate formation of the surfaces constituting the cam grooves 202, the outer peripheral surfaces of the pins 203 and the inner peripheral surface of the gear hole 207. Specifically, as shown in FIGS. 10B and 10C, it is necessary to set the dimensional tolerance of the cam grooves 202 and the pins 203 small. If not, excessive or insufficient contact can occur between the three pins 203 and the gear hole 207, causing the pins 203 to be likely to have serpentine behavior, sliding and suffering great impacts when transmitting power.

Thus, it is desired to ensure transmission of power without impacts by a simple configuration having no need to set the accuracy of fabricating each component at a high degree.

SUMMARY OF THE INVENTION

According to the present invention, there is provided a power transmission mechanism, which comprises: a drive shaft rotatably supported by housings, at least one end portion of the drive shaft projecting from the corresponding housing; and a driven member mounted on the projecting one end portion of the drive shaft with a one-way clutch interposed therebetween; the one-way clutch comprising: a swinging clutch portion in a keyhole-section shape, including a cylindrical portion extending axially of the drive shaft and a projecting portion extending from the cylindrical portion; a clutch portion housing groove formed in the drive shaft, for housing the cylindrical portion, holding the swinging clutch portion swingably about the cylindrical portion; a collar rotatably fitted onto the drive shaft, having a slit formed in such a manner that a distal end portion of the projecting portion can project therefrom and retract thereinto; at least one engaging groove formed in an inner peripheral surface of the driven member to engage the distal end portion of the projecting portion; and a sealing member interposed between the housing and the collar for preventing the collar from rotating together with rotation of the drive shaft; wherein, when the swinging clutch portion is raised by the collar rotating more slowly than the drive shaft rotates, the distal end portion of the projecting portion projects from a periphery of the slit, thereby engaging the engaging groove; and when the swinging clutch portion is laid down, the distal end portion of the projecting portion retracts into the slit, thereby disengaging from the engaging groove.

The one-way clutch is thus simply configured only by making the clutch portion housing groove in a circular groove corresponding to the cylindrical portion, making the swinging clutch portion in a combined shape of a cylinder and a prism, forming the collar in a steel pipe shape, and forming the slit correspondingly to the projecting portion, thereby favorably eliminating the need for setting the accuracy of fabricating each component at a high degree.

Further, the projecting portion can be swung with the cylindrical portion of the swinging clutch portion fitted in the clutch portion housing groove of the drive shaft as the pivot in close contact with the clutch portion housing groove, providing an advantage of securely transmitting power without impacts.

The clutch portion housing groove formed in the drive shaft is preferably formed at a position radially offset from a shaft center of the drive shaft.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

For the description of the present embodiment, a lawn mower will be exemplarily illustrated as an embodiment employing power transmission mechanisms according to the present invention.

Figure 1:
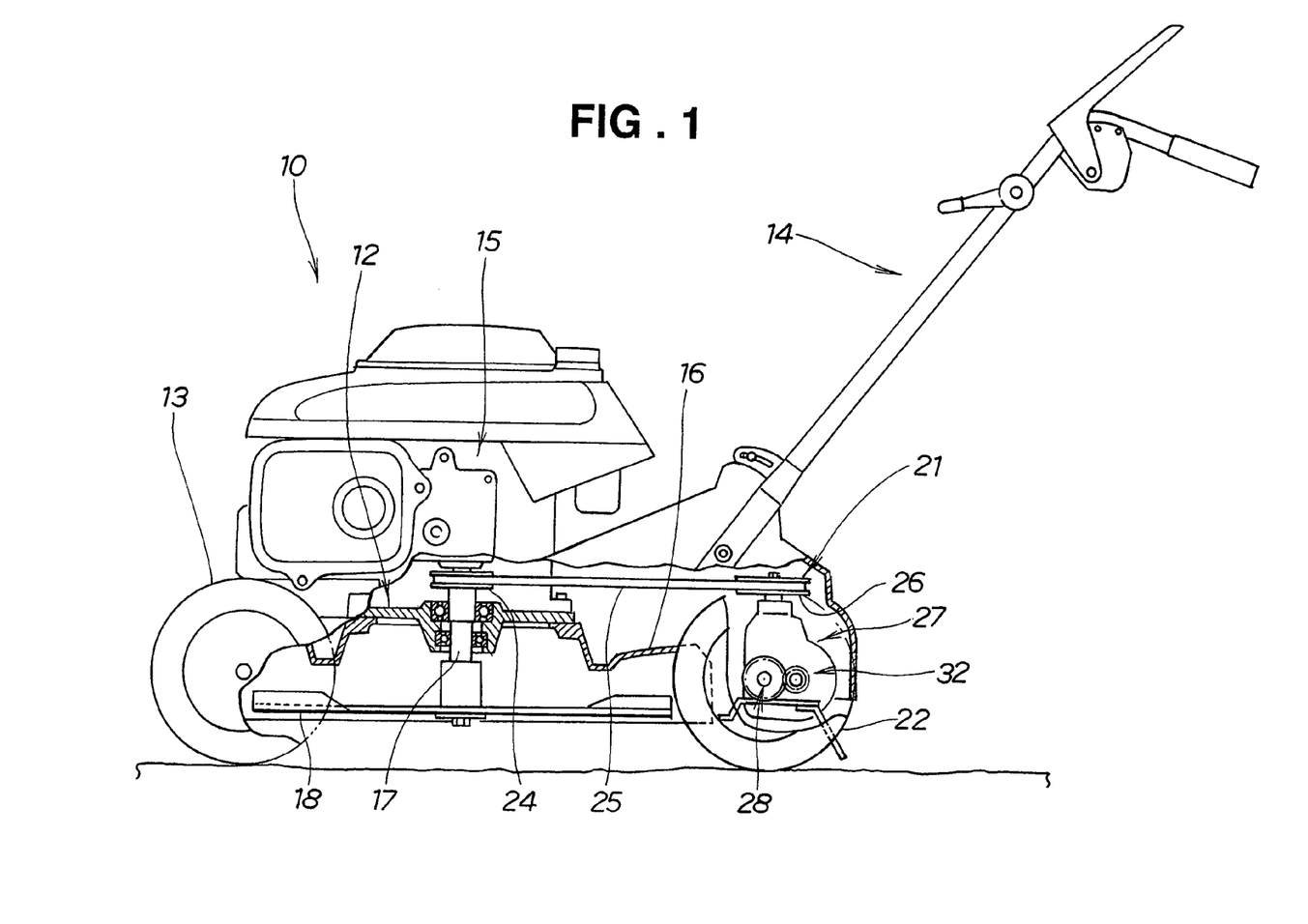
FIG. 1 is a side view of a lawn mower employing power transmission mechanisms of the present invention.

A lawn mower 10 shown in FIG. 1 is a walk-behind self-propelled lawn mower with which an operator mows, walking behind the lawn mower 10.

The lawn mower 10 includes a body frame 12, right and left front wheels 13 mounted to the body frame 12 (the right front wheel 13 is not shown because FIG. 1 is a view of the lawn mower 10 taken from one side), an engine 15 mounted on an upper middle portion of the body frame 12, a cutting blade 18 connected to an output shaft 17 of the engine 15, a drive unit 21 connected to the output shaft 17, and right and left drive wheels 22 as rear wheels connected to the drive unit 21 (only the left rear wheel 22 is shown as described with the front wheels 13).

An operating handle 14 extends obliquely from the rear of the body frame 12 in a rearward and upward direction.

The cutting blade 18 is housed in a cutter housing 16 mounted to a lower middle portion of the body frame 12.

The drive unit 21 includes a driving pulley 24 mounted on the output shaft 17, a driven pulley 26, a belt 25 running between the driving pulley 24 and the driven pulley 26, a drive reduction gear 27 mounted to the body frame 12 and connected to the driven pulley 26, right and left wheel support means 28 (see FIG. 2) mounted to the body frame 12, right and left tubular housings 31 (see FIG. 2) fitted to the body frame 12, and right and left power transmission mechanisms 32, 32 (see FIG. 2) connected to the drive reduction gear 27.

Figure 2:
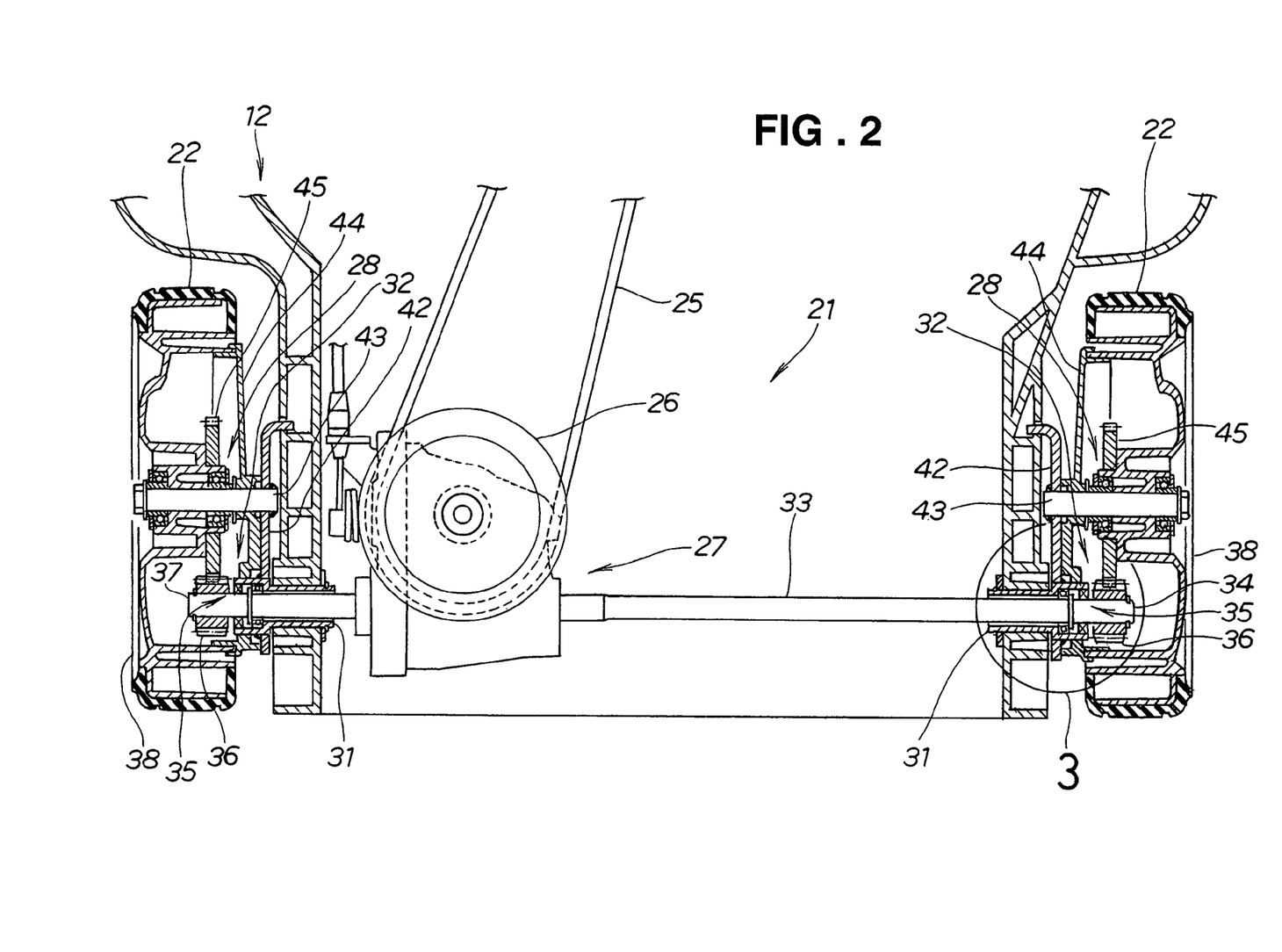
FIG. 2 is a cross-sectional view of a mechanism in which a driving force from a drive shaft is transmitted to right and left rear wheels via the power transmission mechanisms of the present invention.

As shown in FIG. 2, the drive shaft 33 is provided between the right and left power transmission mechanisms 32 with the drive reduction gear 27 interposed therebetween. The opposite ends of the drive shaft 33 are rotatably fitted in the right and left tubular housings 31, respectively. A first end (right end) portion 34 of the drive shaft 33 is projected from the right housing 31. A second end (left end) portion 37 of the drive shaft 33 is projected from the left housing 31.

Right and left driven members 36 are mounted on the first end portion 34 and the second end portion 37 of the drive shaft 33, respectively, with right and left one-way clutches 35 interposed therebetween.

The right and left power transmission mechanisms 32 transmit power from the drive shaft 33, through the driven members 36, 36, to the right and left drive wheels 22, 22 provided on the wheel support means 28, 28. Reference numeral 38 denotes a wheel of the drive wheels 22.

Each wheel support means 28 includes a bracket 42 fixed at its first end to the housing 31 and fitted at its second end to the body frame 12, an axle 43 fixed to the bracket 42, a cover 44 mounted to the axle 43 and the housing 31, and a gear 45 mounted on a boss of the wheel 38, meshing with the driven member 36 provided with the one-way clutch 35.

Now, one of the one-way clutches 35 will be described with reference to FIGS. 3 and 4.

The one-way clutch 35 includes a swinging dutch portion 53, a clutch portion housing groove 54, a collar 55, a slit 56, engaging grooves 57, and a sealing member 61.

The swinging clutch portion 53 has a keyhole-section shape, consisting of a cylindrical portion 51 extending in an axially longitudinal direction (directions of arrows "a") of the drive shaft 33 and a projecting portion 52 extending from the periphery of the cylindrical portion 51.

The clutch portion housing groove 54 is formed in the drive shaft 33 for housing the cylindrical portion 51 of the swinging clutch portion 53, holding the swinging clutch portion 53 swingably.

The collar 55 is fitted onto the drive shaft 33 rotatably (in directions of arrows "b"). The collar 55 has the slit 56 formed in an axially longitudinal direction so that the projecting portion 52 of the swinging clutch portion 53 can project therefrom and retract thereinto.

The engaging grooves 57 are formed in the driven member 36 for engagement with the projecting portion 52.

The sealing member 61 is interposed between the housing 31 and the collar 55 for preventing the collar 55 from rotating together with the rotation of the drive shaft 33. The sealing member 61 is an oil seal, and is desirably provided with a spring 63.

The drive shaft 33 is rotatably supported by the housing 31 via a bearing 64. Reference numerals 65, 65 denote snap rings, and 66, 66, flat rings.

Figure 4:
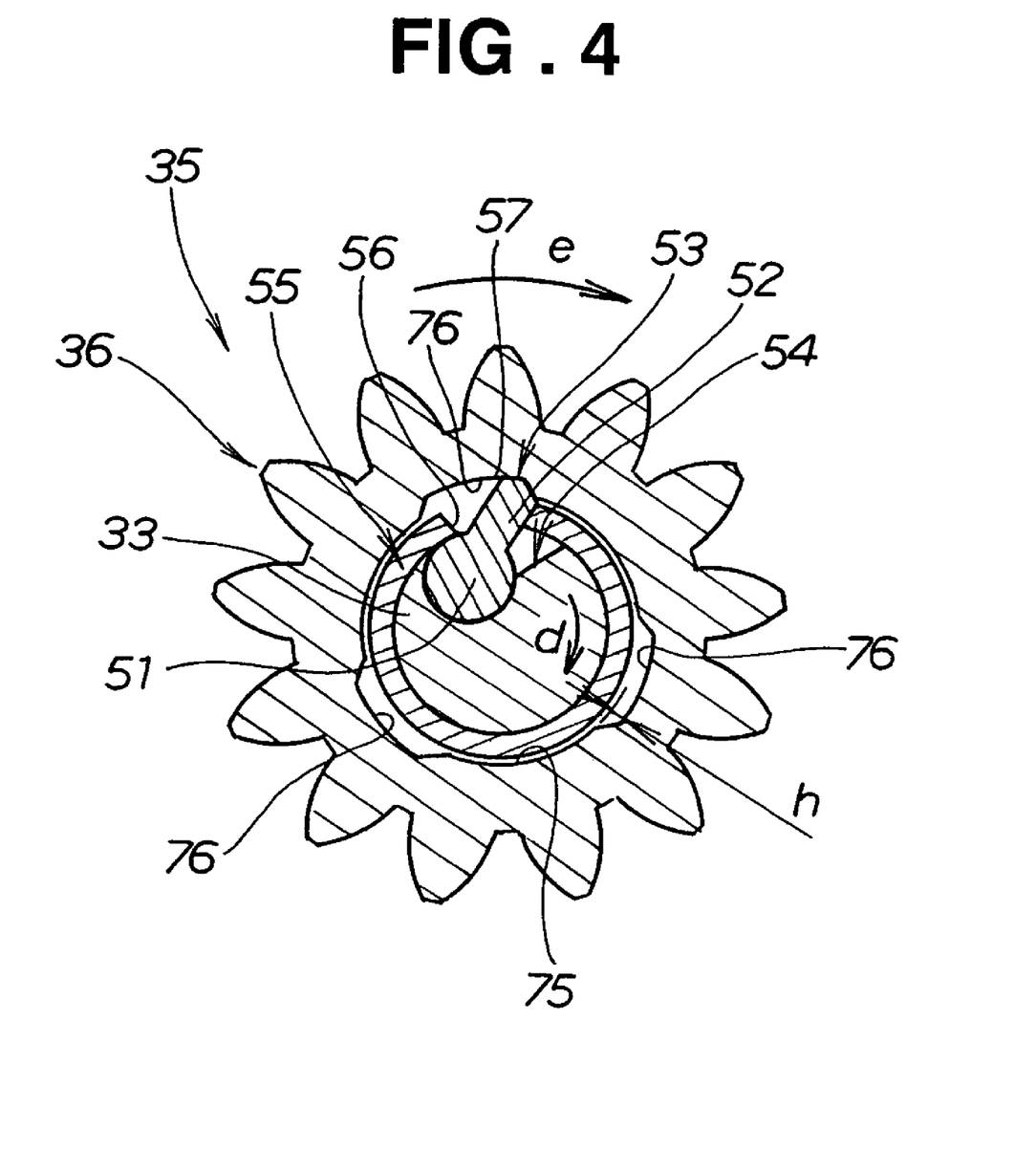
FIG. 4 is a cross-sectional view taken along line 4—4 in FIG. 3.

As shown in FIG. 4, in the one-way clutch 35, when the drive shaft 33 rotates in a direction of arrow "d," the swinging clutch portion 53 engages one of the engaging grooves 57, transmitting power to the driven member 36 as shown by arrow "e."

Figure 5A:
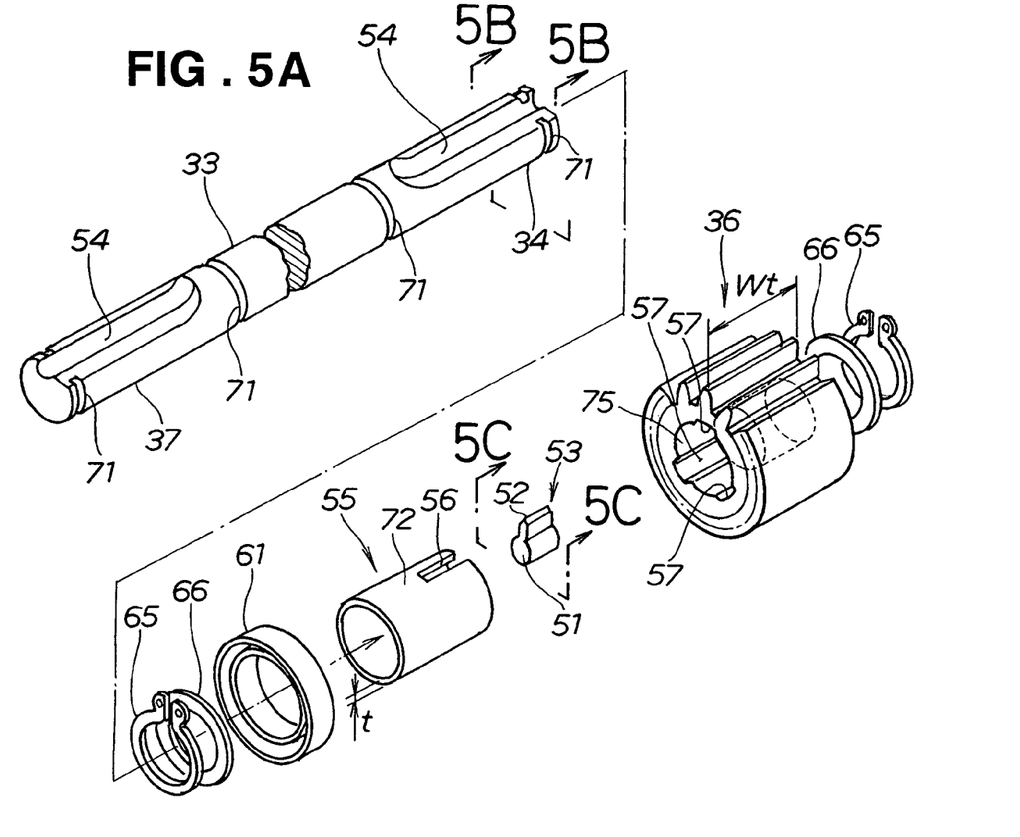
FIG. 5A is an exploded view of the power transmission mechanism shown in FIG. 3.
Figure 5B:
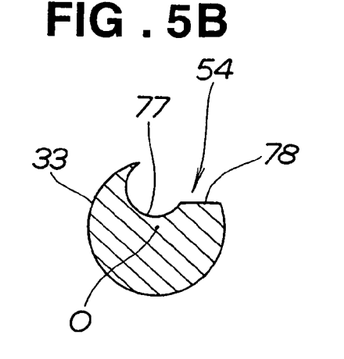
FIG. 5B is a cross-sectional view along line 5B—5B in FIG. 5A.
Figure 5C:
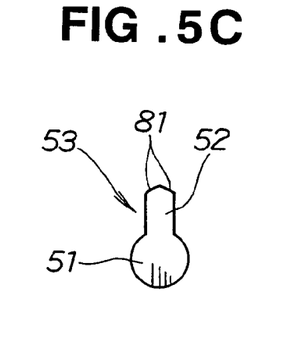
FIG. 5C is a front view of a swinging clutch portion along line 5C—5C in FIG. 5A.

FIG. 5A illustrates in explosion the power transmission mechanism 32 of the present invention; FIG. 5B illustrates in section the first end portion 34 of the drive shaft 33 along line 5B—5B in FIG. 5A; and FIG. 5C illustrates the swinging clutch portion 53 when viewed along line 5C—5C in FIG. 5A.

As shown in FIG. 5A, the drive shaft 33 has the clutch portion housing groove 54 and circumferential grooves 71, 71 formed in the first end portion 34, and the clutch portion housing groove 54 and circumferential grooves 71, 71 formed in the second end portion 37. The snap rings 65, 65 are fitted into the circumferential grooves 71, 71, respectively.

For the drive shaft 33, a steel material defined by S48C in JIS is used, for example.

The collar 55 has a tubular body 72 of a steel pipe with a given thickness "t," having at its first end portion the slit 56 formed in an axially longitudinal direction of the tubular body 72. Slitting facilitates fabrication, and also facilitates the assembly of the swinging clutch portion 53.

For the driven member 36, a spur gear is used, and the facewidth of the spur gear is set at Wt. The driven member 36 may be other than a spur gear, and, for example, a pulley may alternatively be used. For the material of the driven member 36, a sintered material is used, for example.

Each engaging groove 57 is formed in an inner peripheral surface 75 of the driven member 36 with a length approximately half the facewidth Wt. In the embodiment shown in the figure, the three engaging grooves 57 are formed in the inner peripheral surface 75 at equal intervals, but the number thereof can be any.

As shown in FIG. 5B, the clutch portion housing groove 54 consists of a circular portion 77 into which the cylindrical portion 51 of the swinging clutch portion 53 is fitted, and a linear portion 78 extending continuously from the circular portion 77 to the periphery of the drive shaft 33. The clutch portion housing groove 54 is formed at a position radially offset from the center O of the drive shaft 33, serving as a cam groove.

As shown in FIG. 5C, the swinging clutch portion 53 has a keyhole-section shape, consisting of the cylindrical portion 51 and the projecting portion 52 extending from the cylindrical portion 51, as described above. The projecting portion 52 has inclined portions 81, 81 formed at its distal end portion. The formation of the inclined portions 81, 81 makes it possible to reduce the depth "h" of each engaging groove 57 to be engaged with the projecting portion 52 (see FIG. 4) to reduce the size of the engaging grooves 57, and also makes it possible to form the corners of the engaging grooves 57 at an obtuse angle to facilitate forming of the engaging grooves 57. For the material of the swinging clutch portion 53, a sintered material is used.

Now, the operation of the one-way clutch 35 will be described with reference to FIGS. 6A to 6E and FIGS. 7A to 7D.

FIGS. 6A to 6E illustrate the one-way clutch 35 from the state of not transmitting a driving force from the drive shaft 33 to the driven member 36 (non-engagement state) to the state of transmitting a driving force (engagement state).

Figure 6A:
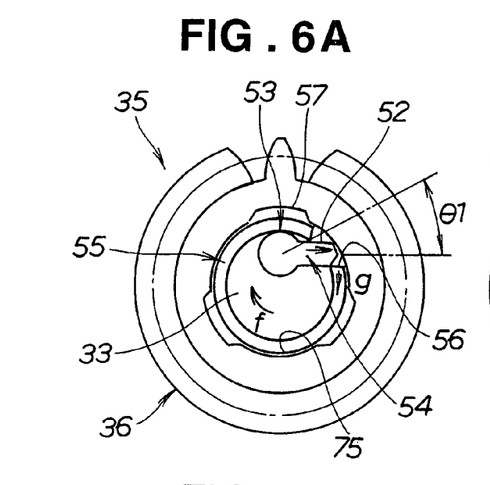
FIGS. 6A to 6E are diagrams illustrating the operation of a one-way clutch portion and a driven member of the power transmission mechanism of the present invention from the state of non-engagement to the state of engagement.

First, in FIG. 6A, the one-way clutch 35 is in a non-engagement state, not transmitting a driving force from the drive shaft 33 to the driven member 36. Specifically, the swinging clutch portion 53 of the one-way clutch 35 moves down at angle θ1 to be within the clutch portion housing groove 54, and at the same time, the distal end portion of the projecting portion 52 of the clutch portion 53 retracts into the slit 56 of the collar 55. Thus, the distal end portion of the projecting portion 52 does not engage any engaging groove 57, and the one-way clutch 35 does not transmit power to the driven member 36. That is, the projecting portion 52 in a linear shape of the swinging clutch portion 53 lies down in contact with the linear portion 78 of the clutch portion housing groove 54.

Figure 3:
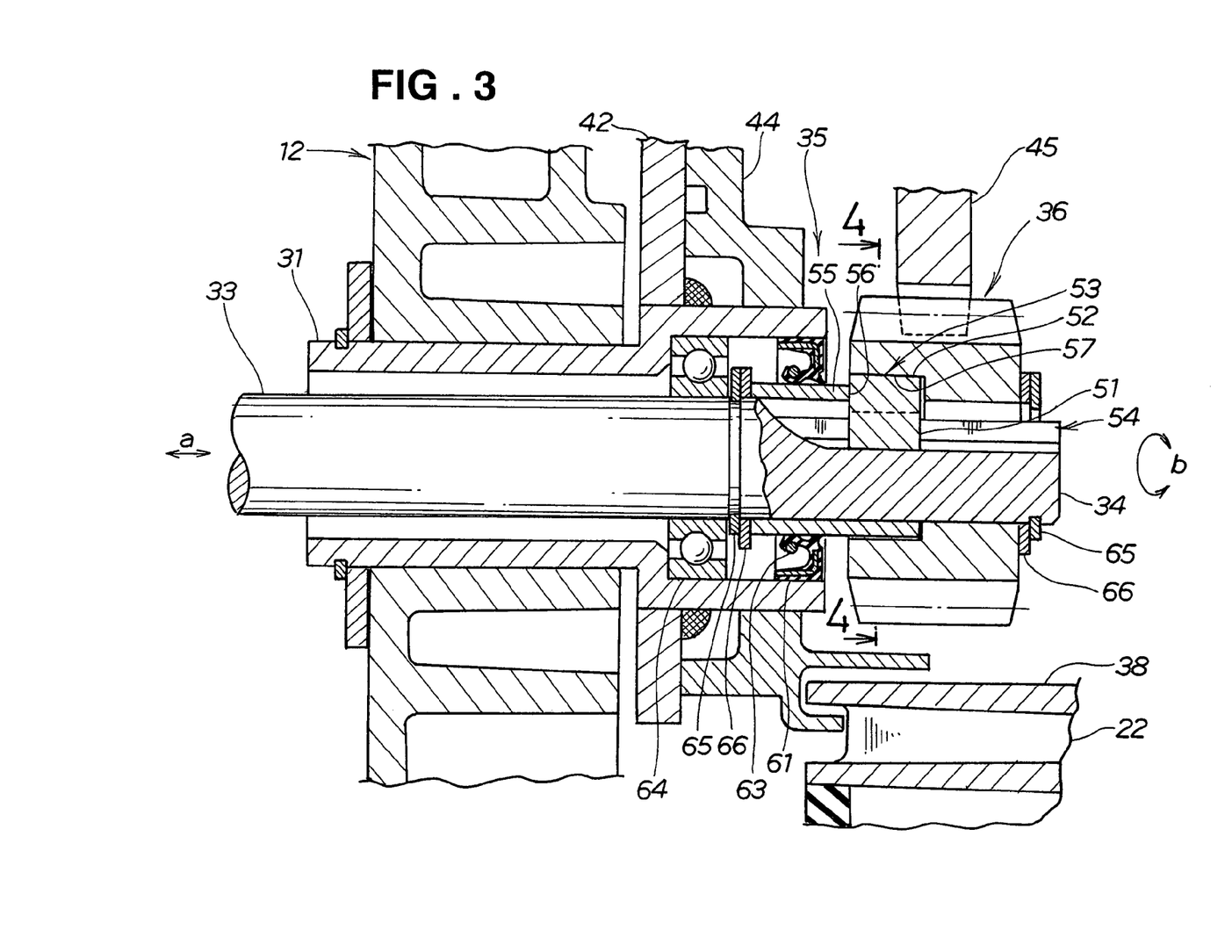
FIG. 3 is an enlarged cross-sectional view of portion 3 in FIG. 2 of the power transmission mechanism.

When the engine 15 (see FIG. 1) of the lawn mower 11 is started and the drive shaft 33 starts rotating in a direction shown by arrow "f," the distal end portion of the projecting portion 52 of the swinging clutch portion 53 fitted in the clutch portion housing groove 54 of the drive shaft 33 abuts on the inner peripheral surface 75 of the driven member 36, being caught on the slit 56 of the collar 55, and the collar 55 starts rotating in a direction shown by arrow "g." At that time, the collar 55 rotates against the fastening force of the sealing member 61 (see FIG. 3).

Figure 6B:
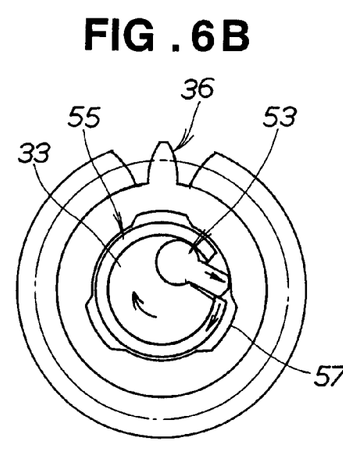

Referring to FIG. 6B, the drive shaft 33 continuously rotates the collar 55 via the swinging clutch portion 53. While the drive shaft 33 and the collar 55 rotate together, the driven member 36 does not rotate and continues stationary.

Figure 6C:
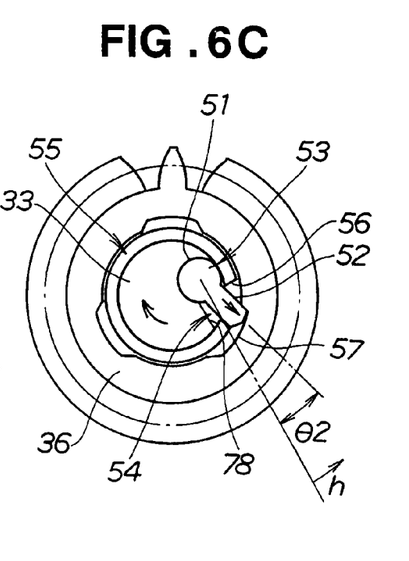

In FIG. 6C, the drive shaft 33 and the collar 55 continue rotating, and when the slit 56 of the collar 55 and the projecting portion 52 of the swinging clutch portion 53 together reach one of the engaging grooves 57 of the driven member 36, the distal end portion of the projecting portion 52 enters the engaging groove 57. Specifically, while the collar 55 is being stopped or rotated with a lag due to the fastening force of the sealing member 61, the distal end portion of the projecting portion 52 enters the engaging groove 57 by the continuously rotating drive shaft 33. In other words, the cylindrical portion 51 of the swinging clutch portion 53 is rotated by the collar 55 at angle θ2 as shown by arrow "h," and the projecting portion 52 is detached from the linear portion 78 of the clutch portion housing groove 54, raised by angle θ2. That is, the collar 55 rotating more slowly than the drive shaft 33 raises the swinging clutch portion 53 to bring the clutch 35 into an engaged state.

Figure 6D:
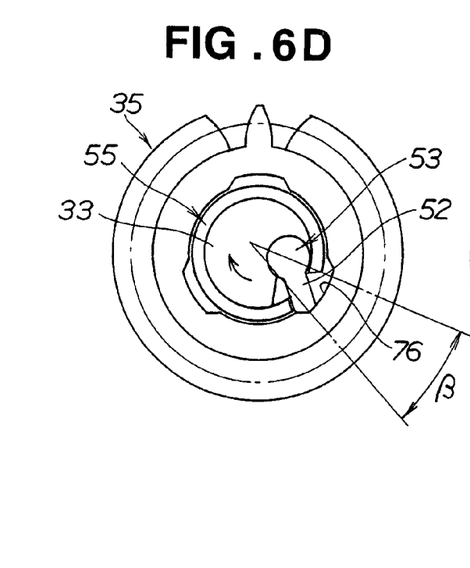

In FIG. 6D, the drive shaft 33 continues rotating, and when the drive shaft 33, the collar 55 and the swinging clutch portion 53 (projecting portion 52) rotate together by angle β approximately corresponding to the width of the bottom 76 of the engaging groove 57, the distal end portion of the projecting portion 52 engages the engaging groove 57, and the one-way clutch 35 is in an engaged state.

Figure 6E:
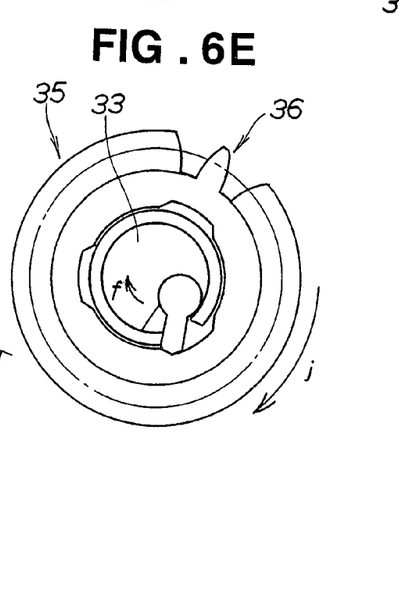

In FIG. 6E, the one-way clutch 35 is in a state of being able to transmit a driving force (engagement state), and a driving force is transmitted from the drive shaft 33 to the driven member 36 as shown by arrow "j." With the rotation of the drive shaft 33, the driven member 36 also rotates.

As described above, the one-way clutch 35 has an advantage that, as shown in FIG. 6C, the projecting portion 52 can be swung by angle θ2, pivoting on the cylindrical portion 51 of the swinging clutch portion 53, and thereby ensuring transmission of power without impacts.

The one-way clutch 35 has the sealing member 61 interposed between the housing 31 and the collar 55 as shown in FIG. 3, thus facilitating the provision of rotation resistance to the collar 55 with the sealing member 61 of a simple configuration.

FIGS. 7A to 7D illustrate the operation of the one-way clutch 35 when the lawn mower 11 (see FIG. 1) is turned when being driven by the engine 15 (see FIG. 1), that is, the operation of the one-way clutch 35 from a state of transmitting a driving force (engagement state) to a state of not transmitting a driving force (non-engagement state). For ease of explanation, these figures show those states with the drive shaft 33 not rotated.

Figure 7A:
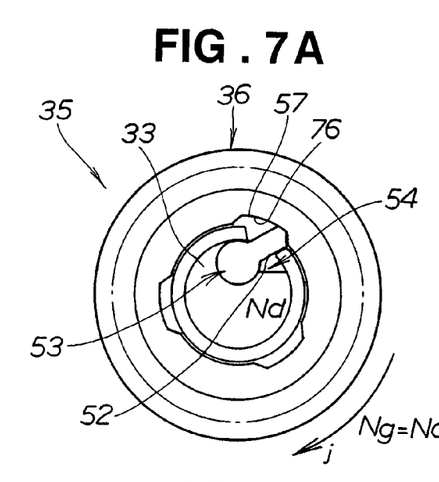
FIGS. 7A to 7D are diagrams illustrating the operation of the one-way clutch portion and the driven member of the power transmission mechanism from the state of engagement to the state of non-engagement.

In FIG. 7A, the one-way clutch 35 is engaged, transmitting a driving force from the drive shaft 33 to the driven member 36, driving the drive wheel 22 (see FIG. 1). With the number of revolutions of the drive shaft 33 as Nd, and with the number or revolutions of the driven member 36 as Ng, the number of revolutions Nd of the drive shaft 33 is equal to the number of revolutions Ng of the driven member 36 (Nd=Ng).

Figures 7B, 7C:
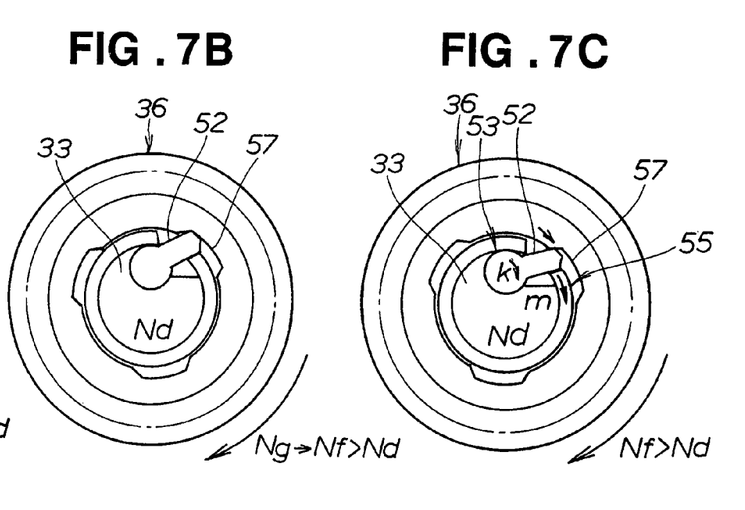

In FIG. 7B, the number of revolutions of the driven member 36 is increased from Ng to Nf relative to the number of revolutions Nd of the drive shaft 33 (Nf>Nd), and the engaging groove 57 of the driven member 36 rotates without interfering with the projecting portion 52, allowing the driven member 36 to rotate faster than the drive shaft 33. The operation of increasing the number of revolutions of the driven member 36 is done by rotating the drive wheel 22 (see FIG. 1) by pushing the operating handle 14 (see FIG. 1).

In FIG. 7C, the driven member 36 is continuously rotated at the number of revolutions Nf, and the engaging groove 57 interferes with the projecting portion 52, causing the collar 55 to rotate together with the projecting portion 52 interfered as shown by arrows "k" and "m" against the fastening force of the sealing member 61 (see FIG. 3). With the rotation of the collar 55, the swinging clutch portion 53 starts moving downward gradually (in the direction of arrow "k").

Figure 7D:
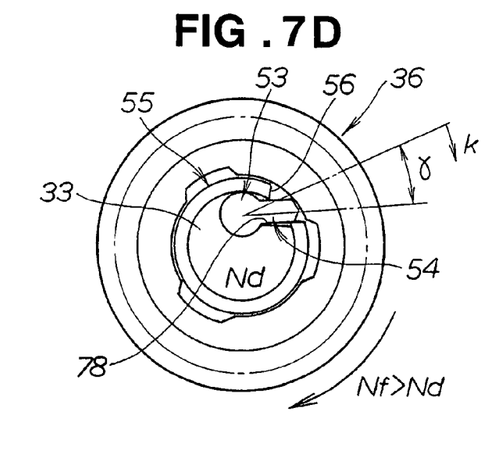

In FIG. 7D, with the rotation of the collar 55, the swinging clutch portion 53 moves down by angle y, and the projecting portion 52 of the clutch portion 53 abuts on the linear portion 78 of the clutch portion housing groove 54, and at the same time, the distal end portion of the projecting portion 52 retracts into the slit 56. Thus, the swinging clutch portion 53 does not engage the driven member 36. In other words, the swinging clutch portion 53 is moved down by the collar 55 by angle y as shown by arrow "k," bringing the clutch 35 into a non-engagement state. That is, the swinging clutch portion 53 is laid down to disengage the clutch 35.

As a result, without receiving a rotational driving force of the drive shaft 33, the driven member 36 can be rotated in a direction (direction of arrow "j"), here, a forward direction, by a small force.

When the drive shaft 33 is not rotated, the driven member 36 rotates in a direction in the same manner. That is, the drive wheel 22 (see FIG. 1) can be rotated in a direction. When manually advancing the lawn mower 11, an operator can move the lawn mower 11 forward by a small force.

Figure 8A:
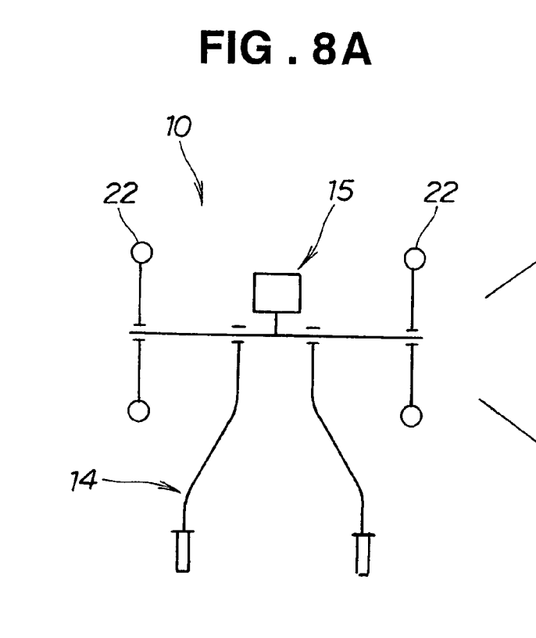
FIGS. 8A to 8C are schematic diagrams illustrating a straight advancing state and a turning state of the lawn mower employing the power transmission mechanisms of the present invention.
Figure 8B:
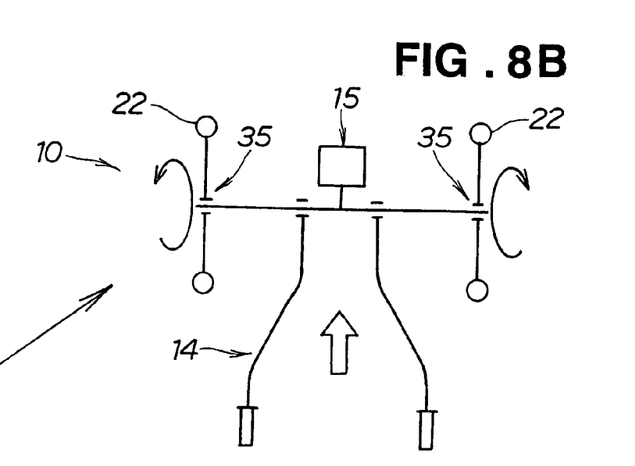
Figure 8C:
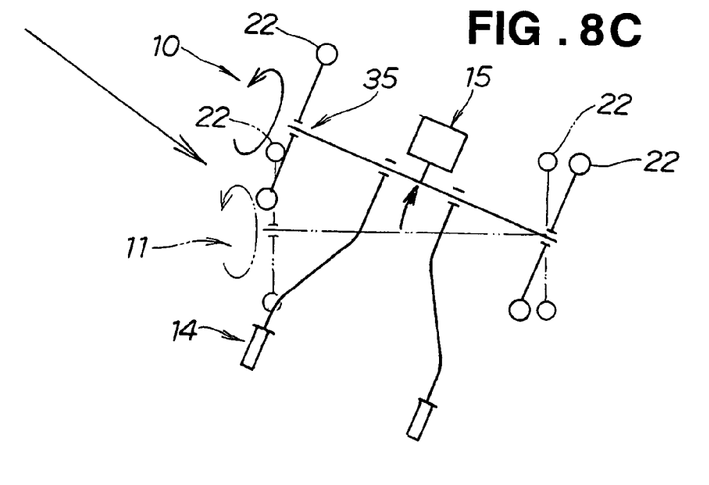

FIGS. 8A to 8C schematically illustrate straight traveling and turning states of the lawn mower 11.

The lawn mower 11 shown in FIG. 8A is advanced by an operator manually pushing the lawn mower 11 without starting the engine 15. As described with FIGS. 7A to 7D, since the one-way clutches 35 do not engage the driven members 36 and the drive wheels 22, 22 rotate freely, the lawn mower 11 can be easily pushed and moved forward by hand.

FIG. 8B illustrates a state where the engine 15 is started. Since the driving force of the engine 15 is transmitted to the right and left drive wheels 22, 22 via the one-way clutches 35, 35 as described with FIGS. 6A to 6E, an operator can cause the lawn mower 11 to move straight.

In FIG. 8C, since the driving force of the engine 15 is not transmitted to the left drive wheel 22 by the one-way clutch 35 as described with FIGS. 7A to 7D, it is easy for an operator to increase the number of revolutions of the left drive wheel 22, and the operator can easily turn the lawn mower 11 right.

In this embodiment, the power transmission mechanisms of the present invention are exemplarily applied to a lawn mower for description, but are also applicable to one-wheel to four-wheel carriers, cultivators and snow plows.

Obviously, various minor changes and modifications of the present invention are possible in the light of the above teaching. It is therefore to be understood that within the scope of the appended claims the invention may be practiced otherwise than as specifically described.

What is claimed is:

1. A power transmission mechanism comprising:
   a drive shaft rotatably supported by housings, at least one end portion of the drive shaft projecting from the corresponding housing; and
   a driven member mounted on the projecting one end portion of the drive shaft by means of a one-way clutch interposed therebetween;
   the one-way clutch comprising:
      a swinging clutch portion of keyhole-section shape, including a cylindrical portion extending axially of the drive shaft and a projecting portion extending from the cylindrical portion;
      a clutch portion housing groove formed in the drive shaft, for housing the cylindrical portion, holding the swinging clutch portion swingably about the cylindrical portion;
      a collar rotatably fitted onto the drive shaft and having a slit formed such that a distal end portion of the projecting portion can project therefrom and retract thereinto;
      at least one engaging groove formed in an inner peripheral surface of the driven member for engagement with the distal end portion of the projecting portion; and
      a sealing member interposed between the housing and the collar for preventing the collar from rotating along with rotation of the drive shaft,
   wherein, when the swinging clutch portion is raised by the collar rotating more slowly than the drive shaft rotates, the distal end portion of the projecting portion projects from a periphery of the slit, thereby engaging the engaging groove, and when the swinging clutch portion is laid down, the distal end portion of the projecting portion retracts into the slit, thereby disengaging from the engaging groove.

2. A power transmission mechanism as set forth in claim 1, wherein the clutch portion housing groove formed in the drive shaft is provided at a position radially offset from a shaft center of the drive shaft.

* * * * *